Oct. 25, 1938. F. A. CONRAD Re. 20,894

SHELF PAPER

Original Filed March 1, 1935

INVENTOR
Fred A. Conrad
BY Wheeler, Wheeler and Wheeler
ATTORNEYS

Reissued Oct. 25, 1938 Re. 20,894

UNITED STATES PATENT OFFICE 20,894

SHELF PAPER

Fred A. Conrad, Milwaukee, Wis., assignor to American Lace Paper Company, Milwaukee, Wis., a corporation of Wisconsin Original No. 2,067,233, dated January 12, 1937, Serial No. 8,825, March 1, 1935. Application for reissue February 25, 1938, Serial No. 192,601

11 Claims. (Cl. 41—10)

This invention relates to improvements in shelf paper.

It is the object of the present invention to provide a shelf paper having an ornamental border so treated as to be substantially free from curling notwithstanding changes of humidity or other phenomena which in the past have tended to cause the downwardly hanging margin of the shelf paper to curl and become uneven.

The present invention seeks to accomplish this objective by the provision of a coating applied to the printed or embossed margin of the shelf paper to stiffen it and at the same time to render it substantially impervious to moisture. Such a coating is preferably applied to both sides of the shelf paper border because, if it were applied only to one side, the untreated surface might absorb moisture, causing the border to curl only slightly less than before. I have found, however, that there should be a difference in the coating applied to the front and rear surfaces of the border in order that the front surface may take the ink used in printing the design thereon. Accordingly, it is a further object of the present invention to provide a shelf paper having an ornamental border stiffened by coating to render it non-curling without interfering with the normal printing operation. Incidentally, the coating applied to the front surface of the border may be tinted to provide a colored background and to minimize the printing required to give a desired effect.

In the drawing.

Like parts are identified by the same reference characters throughout the several views.

Figure 1:
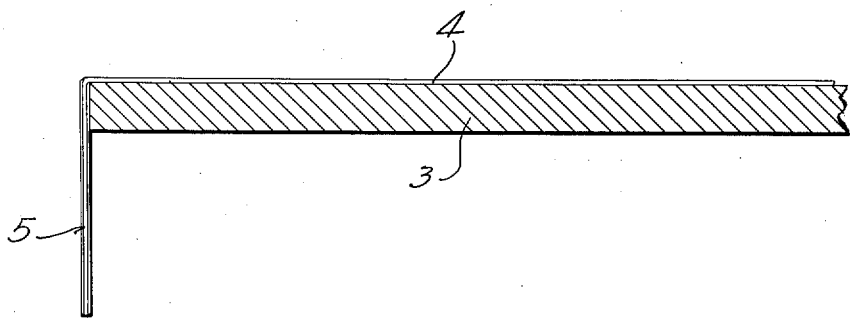
Figure 1 shows in cross section a shelf provided with shelf paper having a border embodying the present invention.
Figure 2:
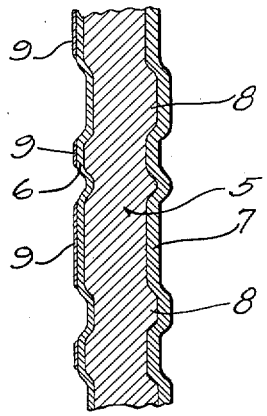
Figure 2 is an enlarged detail in cross section through the decorative border showing embossing, coating, and color printing thereon.

It will, of course, be understood that in the drawing the coating has necessarily been exaggerated for convenience of illustration.

The shelf 3 carries a shelf paper 4 which is of any ordinary composition. Its novelty consists in the manner in which its border portion 5 is stiffened so that it will hang vertically at the front margin of the shelf as shown in Fig. 1.

In accordance with the present invention the marginal portion 5 of the shelf paper has a stiffening coating 6 applied to its forward or outer face and a stiffening coating 7 applied to its rear face. Each of these coatings may be of such a nature as to waterproof the paper to some degree.

It is, of course, possible to apply the entire weight of the coating to one face of the border portion 5 of the shelf paper, but I have found that this is less desirable than the preferred application herein described. I prefer to apply coating material relatively lightly to the front face as shown at 6, and to apply a relatively more heavy coating to the rear face as shown at 7. The front coating at 6 is not so heavy as to prevent the proper application of an ornamental design in ink, but it is sufficiently heavy to materially reduce the weight of coating which would otherwise have to be applied to the rear face to produce any comparable stiffening result.

The coating is preferably applied like paint to the border before the border is embossed. The embossing operation displaces portions of the border stock, as shown at 8. Either before or after embossing the front face of the border may be provided with a printed design of any desired nature, the printing ink being illustrated at 9. The drawing necessarily shows the thickness of the coating in exaggerated form. The material, particularly as applied to the front face, may sink into the paper to virtually become a part thereof and to exert its stiffening effect by increasing the density of the stock without forming such a character of external layer as to prevent the ink from adhering. However, the impregnation of the paper by the stiffening material fills the pores and renders the paper less absorbent, whereby the ink is prevented from penetrating and is caused to dry on the surface with a glossy brilliance.

A wide variety of materials may be used for the coating. In general, these materials may include a filler, a binder, and a liquid vehicle. In the case of the coating for the front face, a coloring pigment may also be included. This makes a pleasant background for the design to be printed thereon in ink.

The filler may comprise any inert substance such as clay or chalk, preferably finely powdered or reduced to a flour. The binder may comprise any gum or adhesive or the like. The liquid vehicle is added to reduce the mass to a suitable consistency so that it may be applied like paint to the paper.

A basic composition useful for either face may include cement, clay, adhesive and water, with or without lithopone. Specifically, one preferred coating comprises (by weight):

| | Per cent |
|---|---|
| Lithopone | 5 |
| White cement | 33 |
| Clay | 5 |
| Coatex | 7 |
| Water | 50 |

(Coatex is a trade name for an adhesive). The exact proportions may be varied by anyone skilled in the art, according to the degree of stiffness desired.

For the front face of the border I have found it very satisfactory to use a slightly different composition as follows:

| | Per cent |
|---|---|
| Lithopone | 64 |
| Ghatti gum | 2 |
| Gum arabic | 6 |
| Color | 3 |
| Water | 25 |

It will be obvious that the color may be omitted, and the other ingredients changed as to proportion, or equivalent ingredients may be substituted, without materially affecting the result.

For the back face of the border, I have found it desirable to include a small amount of commercial wax size in the composition. This paste of emulsified wax tends to reduce offset of the printing ink.

Almost any gums or adhesives may be employed, including locust gum, "Tufjel", and casein, or bone, hide or starch glues and sodium silicate. I have, however, found the named ingredients and the specified proportions to be very satisfactory and to afford a stiffening deposit of sufficient resilience to stand the embossing operation without cracking.

The stiffening treatment is, of course, ordinarily limited to the narrow marginal border strip, the main area 4 of shelf paper usually requiring no stiffening to enable it to lie flat upon the shelf.

I claim:

1. A shelf paper having a marginal strip portion provided on its back surface with a relatively heavy stiffening impregnation and provided on its front surface with a relatively light stiffening impregnation including a coloring pigment providing a tinted background for an ornamental design.

2. A shelf paper having a decorative marginal border portion provided on its rear surface with a relatively heavy coating comprising an inert filler and a binder, and provided on its front surface with a lighter coating of similar nature, said border and coating being embossed.

3. A shelf paper having a decorative marginal border portion provided on its rear surface with a relatively heavy coating comprising a stiffening filler and a binder, and provided on its front surface with a lighter coating of similar nature, said border and coating being embossed, and bearing an ornamental design applied in color on the face of its front surface coating.

4. A shelf paper comprising a border portion provided on its rear surface with a stiffening coating, said coating comprising a means for reducing offset, said border being printed and embossed.

5. A shelf paper comprising an embossed border portion provided with a stiffening coating and having printing on one face and having its opposite face treated with an offset-reducing material.

6. A shelf paper comprising the combination with an untreated portion adapted to rest flat upon a shelf, of a marginal border portion comprising a single ply extension of said first mentioned portion and adapted to hang vertically across the margin of such a shelf, said border portion having its entire surface area coated with a stiffening material including an inert pore filling substance and a separate binder.

7. A shelf paper comprising the combination with a shelf covering portion adapted to lie flat upon a shelf, of a border portion comprising an integral one-ply extension of said shelf covering portion and adapted to hang vertically across the margin of such a shelf, said border portion having its entire face and its entire rear face partially impregnated with a stiffening and water-resistant material including an inert pore filling ingredient and a separate binder.

8. A shelf paper comprising the combination with a shelf covering portion applicable to the upper surface of a shelf, of a border portion comprising an extension of said shelf covering portion and adapted to hang vertically across the margin of such a shelf, said border portion being provided throughout its extent, and to the exclusion of said shelf covering portion, with an earthy pore-filler and being embossed, said pore-filler being adapted to stiffen and partially waterproof said border portion, without interfering with the embossing thereof.

9. A shelf paper having a flat shelf covering portion, an embossed border portion, and an impregnating stiffening coating for both sides of the border portion.

10. A shelf paper having a flat shelf covering portion, an embossed border portion imprinted on its exposed face, and a complementary stiffening coating for both sides of the border portion adapted to prevent distortion.

11. A shelf paper having a shelf covering portion, a contrasting border portion adapted to occupy a pendant position with reference to the shelf covering portion, and an impregnating stiffening material applied to both sides of the border portion, said border portion being embossed and imprinted on its exposed side and held against distortion by said stiffening material.

FRED A. CONRAD.